Hayford & Strout,
Hay Press.
N° 47,950.  Patented May 30, 1865.
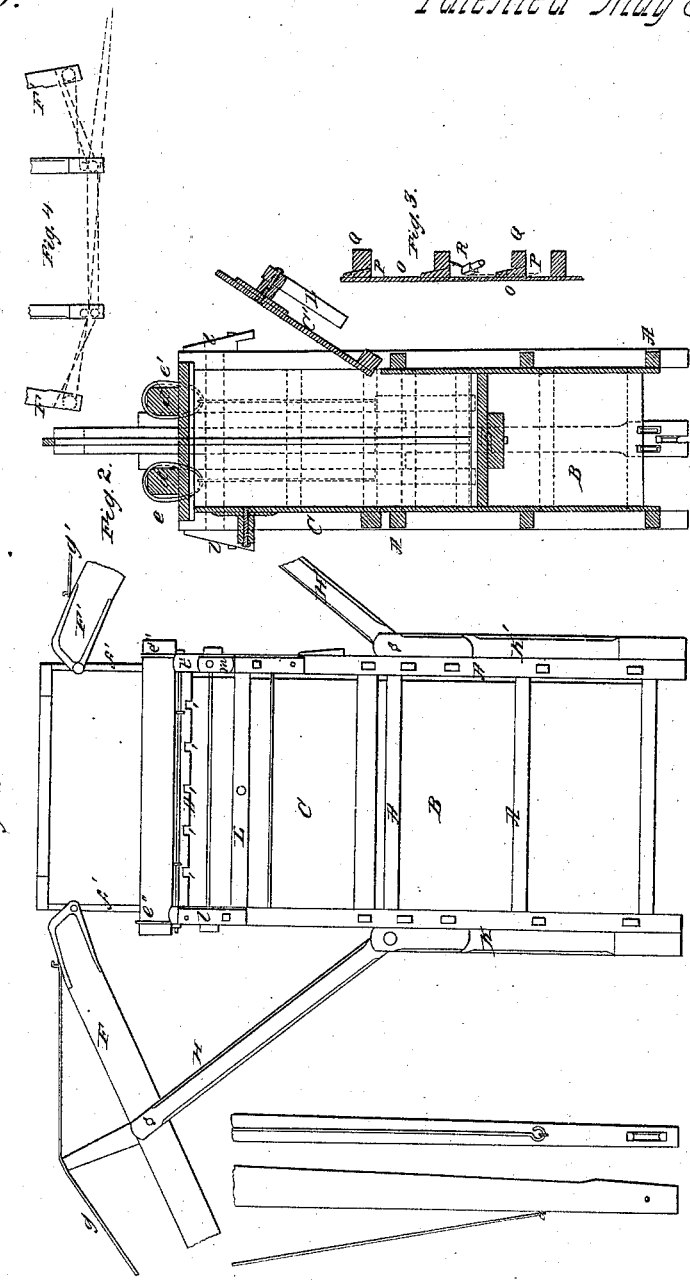

UNITED STATES PATENT OFFICE.

AXEL HAYFORD AND AMBROSE STROUT, OF BELFAST, MAINE.

IMPROVEMENT IN HAY-PRESSES.

Specification forming part of Letters Patent No. 47,950, dated May 30, 1865.

*To all whom it may concern:*

Be it known that we, AXEL HAYFORD and AMBROSE STROUT, both of Belfast, in the county of Waldo and State of Maine, have invented new and useful Improvements in Hay-Presses; and we do hereby declare that the following is a full, clear, and exact description of the construction and operation of the same, reference being had to the annexed drawings, making a part of this specification, in which—

Figure 1 is a front elevation with the toggle arms and levers broken. Fig. 2 is an end elevation. Fig. 3 is a sectional view of the sliding side of the lining to release the bale; and Fig. 4 is a view of one way in which the rope or chain works the toggle arms or levers that give the required pressure.

It is the object of our invention to render the hay-press light, that it may be easily transported from one crop to another, and thus save the transportation of the crops from a distance to the press at serious cost, and also to enable the press to work fast without an increase of power; and to this end our invention consists in arranging and combining the follower and toggle-levers with the press so as to be operated rapidly by one or two ropes or chains and a single capstan; in so arranging and combining a brace-bar with the swinging doors and catches on the frame that the turn of a button will permit the release of the bar from both catches of the frame and permit the door to open freely, or when in place the turn of the button will hold the door securely closed to receive the pressure of the bale of hay; and in securing the end or ends of the frame by a wedge-connection, so as to release one or both by the single movement of a lever that shall close and firmly hold the ends to receive the pressure, or release them to permit the removal of the finished bale of hay.

A frame, A, is constructed of four upright and suitable cross-braces, to contain and support a box, B, of the capacity desired for making bales of hay that shall weigh about four hundred pounds, more or less. At the upper end of the front and rear of the box, doors C and C' are hinged on their lower edges, to permit access to the interior of the press while being filled with hay, and to be closed when the hay is to be pressed into a bale. The top of the box D is made strong, and has two strong cross-pieces, $d$ and $d'$, upon it, that project far enough over the ends of the box to receive strong stirrups $e$, $e'$, $e''$, and $e'''$, which can be slipped from over the cross-pieces, so as to let the box top be removed when desired, or made to clamp the ends of the pieces $d$ and $d'$ when the bale is under pressure. The under side of the top is grooved or notched to receive the hoops at the points 1. Within the box a follower, E, is suspended upon strong straps $f$ and $f'$, attached securely to it at their lower ends, and the straps project upward above the top of the box far enough to give the follower the desired traverse within the box. These straps move vertically in grooves in the frame so placed as to preserve them always in a horizontal position, and at their upper ends are attached securely by a hinged joint to the toggle-levers F F', which carry brace-rods $g$ and $g'$, to prevent them from springing when exerting pressure. To the outside of the frame, at each end, are secured strong uprights K and K', to support the levers F and F', and which are connected therewith by the braces H and H', pivoted or hinged at one end to the uprights K and K', and at the other to the levers F F', at a suitable distance from the strap-joints to give the proper range of vertical motion to the follower E. At the lower ends of the levers ropes or chains are attached, which terminate at a suitable windlass or capstan, to draw the levers and compress the hay into a bale of the size desired. These ropes, as shown in Fig. 4, are attached at one end to the lower end of the lever, and that attached to lever F passes beneath guide-pulleys in the frame to and around a pulley in the end of lever F', and both over and around a second guide-pulley in the frame to the other rope, to which it is spliced or tied. The other line, which is made fast at one end to the lever F', then passes under guide-pulleys in the frame to and around a pulley in the lever F, back under other guide-pulleys in the frame to the windlass or capstan. Thus it will be perceived that the capstan at each turn moves both levers F and F' at the same speed, and they will of course move more or less rapidly as the capstan is turned faster or slower, but uniformly both alike, and thus the follower E will rise horizontally, and when the levers are brought down to their lowest position, the bale will be of a uniformly symmetrical figure.

To enable the doors at the upper sides of the box to be opened and closed with facility and held firmly closed, we attach a brace-bar, L, centrally by a bolt to the back or outside of each door near the upper edge. On one side of the frame a clamp, $l$, is secured, which receives and holds one end of the brace-bar, and on the opposite side of the frame a clamp, $l'$, receives the other end of the brace-bar, and a turn of the button $m$ down on the bar holds it securely between the clamps, and then the door is firmly supported by the clamps against the pressure of the bale, and the release of the button $m$ permits the bar to move only the distance it is wide from the clamps, and thus releases the door without loss of time. In order to release the bale with facility, when finished, from the press, it is necessary to relieve slightly one or both ends of that portion of the box within which the bale is pressed, and to effect this we have invented the device shown in Fig. 3, in which the lining O of one end of the upper part of the box is shown attached to braces P, which are of a wedge shape on their outer sides, and match with the wedge-shaped braces Q of the frame. A lever, R, is attached at one end by a link to the lining O, or to one of the braces P, and has its fulcrum secured by a link-connection to one of the cross-timbers of the frame, while the long end of the lever projects beyond the frame. Now, when the pressure is on the bale the lever is depressed until the wedged portions of the divided braces match, when the lining O will be in the same plane with the lining of its end of the press; but when the lever is raised, the lining O and its wedge-shaped portion of the divided braces will fall a short distance, and clear of the end of the bale, which can then be removed free from any binding on its ends in the press; and when the stirrups are removed from the bars on the top, the doors are opened, and the lining O dropped down, the bale can be rolled from the follower without being bound in any part by the press.

It is obvious that when the bale is pressed hoops can be passed through the grooves of the top and of the follower which correspond with them, and that when the ends of the hoops are brought together and securely fastened the bale will retain the form given the hay by the press.

What we claim as our invention, and desire to secure by Letters Patent of the United States, is—

1. The combination and arrangement of the follower, toggle-lever, and two cords with the capstan, in the manner substantially as and for the purpose set forth.

2. The combination of the door, catch-bar, and a single button with the frame, when arranged substantially as and for the purpose set forth.

3. The combination of the lever R, the end lining, O, and wedged braces P and Q with the box B, substantially as described, for the purpose set forth.

In testimony whereof we have hereunto subscribed our names.

AXEL HAYFORD.
AMBROSE STROUT.

Witnesses:
WM. H. BURRILL,
WM. L. HAYFORD.